United States Patent
Rothschild et al.

(10) Patent No.: US 12,361,750 B2
(45) Date of Patent: Jul. 15, 2025

(54) SYNTHETIC EMOTION IN CONTINUOUSLY GENERATED VOICE-TO-VIDEO SYSTEM

(71) Applicant: EMC IP Holding Company LLC, Hopkinton, MA (US)

(72) Inventors: Seth Jacob Rothschild, Littleton, MA (US); Alex Robbins, Cambridge, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 391 days.

(21) Appl. No.: 17/446,193

(22) Filed: Aug. 27, 2021

(65) Prior Publication Data

US 2023/0061761 A1 Mar. 2, 2023

(51) Int. Cl.
| | | |
|---|---|---|
| *G06V 40/16* | (2022.01) | |
| *G06V 20/40* | (2022.01) | |
| *G10L 25/63* | (2013.01) | |
| *G11B 27/034* | (2006.01) | |
| *G11B 27/036* | (2006.01) | |
| *G11B 27/34* | (2006.01) | |

(52) U.S. Cl.
CPC ............ *G06V 40/161* (2022.01); *G06V 20/46* (2022.01); *G06V 40/176* (2022.01); *G10L 25/63* (2013.01); *G11B 27/034* (2013.01); *G11B 27/036* (2013.01); *G11B 27/34* (2013.01)

(58) Field of Classification Search
CPC .... G06V 40/161; G06V 20/46; G06V 40/176; G10L 25/63; G10L 2021/105; G10L 21/10; G10L 25/57; G11B 27/034; G11B 27/036; G11B 27/34; G06T 13/205; G06T 13/40; G06T 13/80
See application file for complete search history.

(56) References Cited

U.S. PATENT DOCUMENTS

| | | | |
|---|---|---|---|
| 6,208,373 B1 | 3/2001 | Fong et al. | |
| 9,204,098 B1 | 12/2015 | Cunico et al. | |
| 10,440,324 B1 | 10/2019 | Lichtenberg et al. | |
| 10,904,488 B1 * | 1/2021 | Weisz | G06V 10/774 |
| 2010/0201780 A1 | 8/2010 | Bennett et al. | |
| 2015/0381939 A1 * | 12/2015 | Cunico | G06T 7/20 348/14.07 |

(Continued)

OTHER PUBLICATIONS

Wikipedia: Deepfake, https://en.wikipedia.org/wiki/Deepfake, Accessed as early as Feb. 2021.

(Continued)

*Primary Examiner* — Nay A Maung
*Assistant Examiner* — Vaisali Rao Koppolu
(74) *Attorney, Agent, or Firm* — Workman Nydegger

(57) ABSTRACT

One example method includes collecting an audio segment that includes audio data generated by a user, analyzing the audio data to identify an emotion expressed by the user, computing start and end indices of a video segment, selecting video data that shows the emotion expressed by the user, using the video data and the start and end indices of the video segment to modify a face of the user as the face appears in the video segment so as to generate modified face frames, and stitching the modified face frames into the video segment to create a modified video segment with the emotion expressed by the user, and the modified video segment includes the audio data generated by the user.

18 Claims, 5 Drawing Sheets

(56) References Cited

U.S. PATENT DOCUMENTS

| | | | | |
|---|---|---|---|---|
| 2016/0148043 | A1* | 5/2016 | Bathiche | H04N 7/147 |
| | | | | 382/118 |
| 2016/0232941 | A1* | 8/2016 | Cunico | H04N 7/155 |
| 2018/0227339 | A1* | 8/2018 | Rodriguez | H04L 65/403 |
| 2023/0035306 | A1* | 2/2023 | Liu | H04N 19/597 |
| 2023/0121540 | A1* | 4/2023 | Stratton | G06V 10/764 |
| | | | | 345/423 |

OTHER PUBLICATIONS

Faceswap website, https://faceswap.dev/, Accessed as early as Feb. 2021.

* cited by examiner

SYNTHETIC EMOTION IN CONTINUOUSLY GENERATED VOICE-TO-VIDEO SYSTEM

RELATED APPLICATIONS

This application is related to U.S. patent application Ser. No. 17/443,121, filed Jul. 21, 2021, and entitled CONTINUOUS VIDEO GENERATION FROM VOICE DATA (the "'121 application"). The '121 application is incorporated herein in its entirety by this reference.

FIELD OF THE INVENTION

Embodiments of the present invention generally relate to video streams and audio streams. More particularly, at least some embodiments of the invention relate to systems, hardware, software, computer-readable media, and methods for inserting synthetic emotions, such as human emotions, into a pre-recorded video stream.

BACKGROUND

With increasing emphasis on the privacy and security of personal data, interest has developed in generating approaches that enable a user to be decoupled in some way from his personal information, which may include the physical appearance of the user. For example, a video may be recorded of a user and the lips of the user manipulated, as the user speaks in real time, to make it appear in the video as though the user in the video is speaking. In this way, the user does not appear in real time in the video, but the video conveys the appearance that a live user is speaking. Thus, a viewer hears the user in near-real time, but does not see the user as the user actually appears while speaking. Instead, the viewer sees the user as the user appears in the pre-recorded video.

While an approach such as that just described could be effective in decoupling the user from his personal information, it would not be adequate to convey tone and emotions of the user while the user is speaking. That is, while the lips may move in synch with the spoken words, the face of the user in the video does not convey the emotion of the user. For example, the mere movement of the lips of the user, to achieve synch with the spoken words, is inadequate by itself to convey emotions, such as happiness or sadness for example, that can only be expressed with additional, or alternative, elements of the face of the user. Likewise, simple lip movements may not adequately convey the tone of the user while she is speaking.

In more detail, when people are on live video, the tone of what they are saying matches the emotion conveyed by their face. Thus, facial reactions may be important to the creation of lifelike video, particularly if the video has been decoupled from the user. However, even though some users may want emotions tied to their video, there is presently no way to achieve this result without turning a camera on the user, which would then defeat the decoupling of the user from her personal appearance because the user would be appearing in real time.

Finally, another possible approach to introducing emotion into a pre-recorded video might be to directly combine pre-recorded video clips according to what emotion is detected. That is, when an emotion is detected in the voice of a user speaking in real time, the video clip with the correct emotion could be played. A problem with this approach however is that it would be quite difficult and time consuming, if not impossible, to line up videos corresponding to the different emotions so that the transition between video clips and, thus, emotions, would not be apparent to the viewer.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
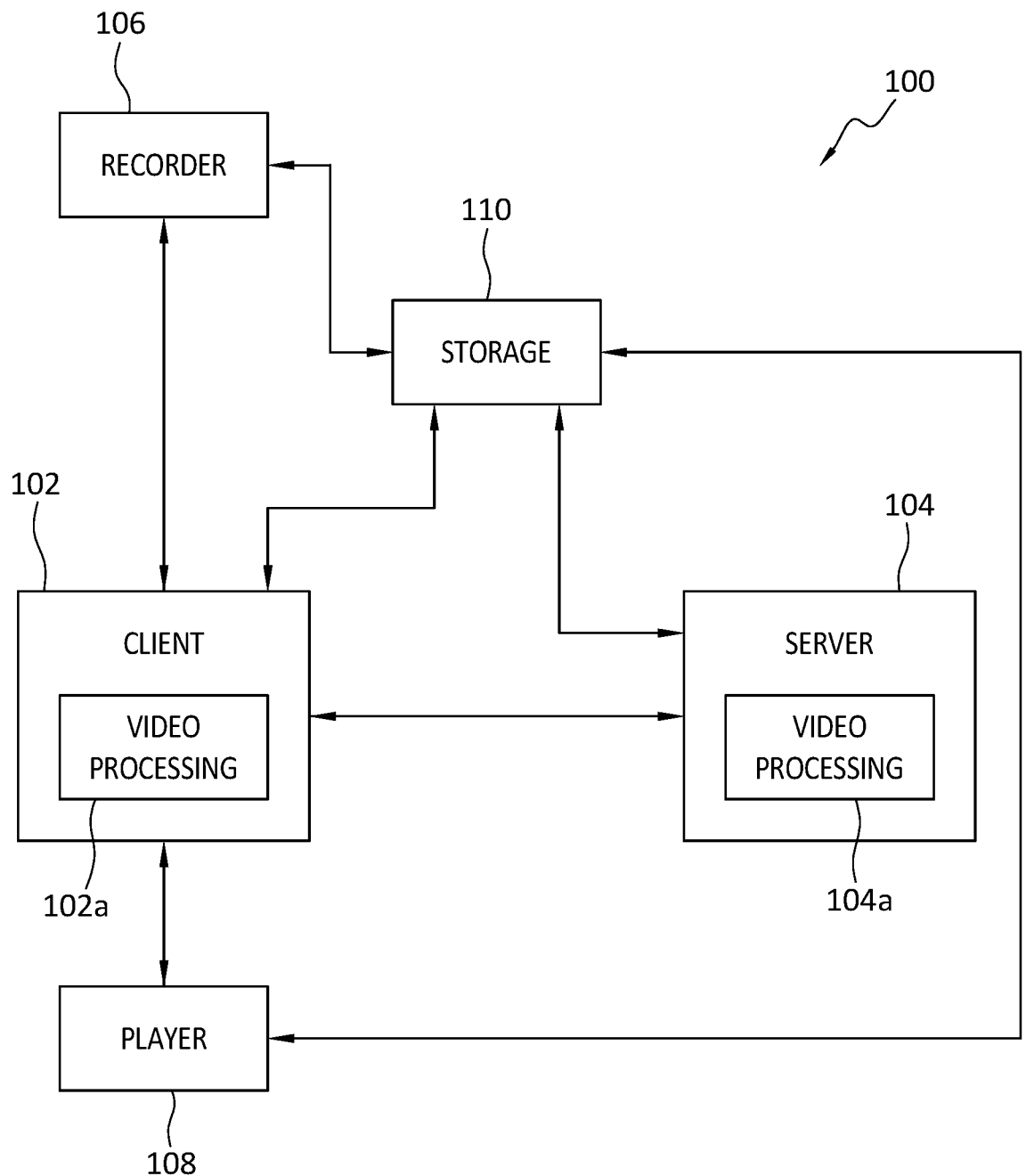
FIG. 1 discloses aspects of an example operating environment for some embodiments.

Embodiments of the present invention generally relate to video streams and audio streams. More particularly, at least some embodiments of the invention relate to systems, hardware, software, computer-readable media, and methods for inserting synthetic emotions, such as human emotions, into a pre-recorded video stream.

As noted earlier, conventional approaches fail to provide for inserting the emotions of a user speaking in real time, into a pre-recorded video of a user that is being played back while the user is speaking, in such a way that the modified video appears natural and lifelike to a viewer. That is, the resulting video lacks a variety of facial expressions such as would be needed to effectively convey the emotion of the speaker. Since the face in the video used is from a pre-recorded video, and is not the face of the user as the user appears in real time, the face in the video will not emote in the same way that the user really would if the user were on camera. This can lead to odd mismatches where the audio, that is the words spoken by the user in real time and inserted into the pre-recorded video in real time or near real time, might be laughing, but the face of the user in the pre-recorded video is completely deadpan, with only the lips matching the laugh.

As such, example embodiments include ways to modify a pre-recorded video, decoupled from the user who appears in the video, to include and display emotion detected in a real time audio stream generated by the user. The emotions may be inserted into the pre-recorded video in near real time so that from the perspective of a viewer of the video, the pre-recorded video may appear to show the user and the emotions of the user in real time.

Further, example embodiments include methods to modify the pre-recorded video according to detected emotion in the real time audio spoken by the user. At least two different approaches are disclosed herein. One embodiment may employ what is referred to herein as 'faceswap' functionality which comprises moving a face from one video into another video. In this example embodiment, a face swap is performed that face swaps the user for themself, and in this way the emotions of the user speaking may be moved directly onto the user face in the target pre-recorded video. Thus, a viewer watching the video will see a pre-recorded user face inserted into a different pre-recorded video so that the inserted face reflects the emotion of the audio of the user.

Because the emotions may be inserted into the pre-recorded video relatively quickly, that is, with relatively low latency or lag, the modified video, although it may not actually include real time audio of the user, may sound and appear to a viewer to be a real time, or live, video of the user. This is true as well for embodiments that employ a facewarp approach.

As well, since the actual face of the user who is speaking is not presented in the video however, the face in the video is not a real time depiction of the user who is speaking and whose voice is heard, and emotions seen/heard, in the video. That is, the video is still decoupled from the real time appearance of the face of the user, although the actual voice, tone, and emotions, of the user are conveyed in the video.

Another example embodiment operates to warp, rather than faceswap, an expression in a video. This warping may be referred to herein as 'facewarp.' In this facewarp embodiment, points on a real face are moved from a pre-recorded video to convey emotion on the face displayed in the pre-recorded video.

As will be apparent in view of this disclosure, example embodiments may insert emotions and/or tone of a user to a pre-recorded video that is being played back while the user speaks. In this way, example embodiments may contribute significantly to the realism of the modified pre-recorded video, even though the user does not appear in real time in that video. Embodiments of the invention may be widely applicable and may be implemented, for example, in video recording/playback devices, such as webcams for example.

Note that as used herein, 'near real time' refers to a lag, or latency, behind real time. The lag or latency of near real time may be in the range of about zero seconds to about 1.5 seconds, in some embodiments. Near real time may embrace a lag or latency that is greater than zero but is still sufficiently short that the lag or latency is not apparent to a viewer. Thus, for example, audio from a user may be captured and inserted into a pre-recorded video, which is being streamed to a viewer, in near real time.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of at least some embodiments of the invention is that the actual face of a user may be decoupled from a pre-recorded video of the user. An embodiment may provide for insertion of tone and/or emotion of a user into a pre-recorded video that is playing at the same time that the user is speaking. An embodiment may enable audio generated by a user, such as by speaking for example, to be inserted in near real time into a pre-recorded video of a user that is being played back to a viewer while the user is speaking. An embodiment may generate a video that appears, to a viewer, to be a real time depiction of the face, voice, and emotions of, a user when, in fact, the depiction in the video was pre-recorded, and only the audio/tone/emotion of the user is presented in real time, or near real time, in the video.

It is noted that while reference is made herein to a user who is speaking, example embodiments extend as well to a user who is expressing herself other than by simply speaking, such as by singing, chanting, or otherwise expressing herself in an audible manner. As well, although reference is made herein to human users, example embodiments may extend as well to animals who are able to express themselves in an audible manner and whose faces may convey various different emotions.

A. Overview

The following is an overview relating to example embodiments. This discussion is not intended to limit the scope of the invention, or the applicability of the embodiments, in any way.

Some approaches to video stream manipulation, such as Snapchat for example, may employ various filters to modify a video stream. However, such approaches are predicated on the use of a live video stream, such as from a smartphone camera for example. In contrast, example embodiments disclosed herein do not require, and may purposely omit, the use of live video streams, such as to decouple the user from her personal data, such as her appearance. Although such filters are incapable of the functionality disclosed herein, they nonetheless demonstrate that it may be possible for a relatively weak computer of limited processing capabilities, such as a smartphone for example, to continuously stream modified live video from a pre-trained machine learning model. Thus, example embodiments may make use of the fact that if training takes place ahead of time, that is, before the modified pre-recorded video is presented to a viewer, the resulting model may be employed in real time to present the modified pre-recorded video to a viewer.

As noted, at least some example embodiments may employ various approaches to presenting a pre-recorded video that includes real time, or near real time, audio/tone/emotions generated by a user as the pre-recorded video is presented. Such approaches may include, for example, using a face swap approach to combine an emotion video with the base video when emotion is detected. Another example approach may involve directly modifying the face, in the pre-recorded video, when emotion in the voice of the speaking user is detected. In either case, audio/emotion detection may be used to modify a video output.

B. Aspects of an Example Operating Environment

With attention first to FIG. 1, details are provided concerning an example operating environment 100 for some embodiments of the invention. The operating environment 100 may implement a client 102-server 104 model, although that is not necessarily required. In some embodiments, the client 102 and server 104 are separate and distinct entities while, in other embodiments, the client 102 and server 104 may be respective elements of the same computing entity. Both the client 102 and the server 104 may include respective video processing modules 102*a* and 104*a* that may be operable to perform any of the disclosed methods, processes, and operations, including those disclosed in FIGS. 2 and 3 discussed below.

The client 102 may communicate, such as to receive audio files, video files, audio streams, and video streams from, with a recorder 106, such as a video camera for example, that is operable to generate and store a video stream, and generate and store an audio recording. Note that video files and video streams may comprise both an audio component and a video component. The recorder 106 may include a microphone or microphone array, and may be any system, device, and/or software, operable to generate a video stream, that includes both audio and video components, and may take the form, for example, of a video camera, webcam, or other system or device. In some embodiments, the recorder 106 may also be able to play back any recorded video and/or audio. As well, the client 102 may communicate with a player 108 that may be operable to play back a video file, video stream, audio file, and an audio stream. Video formats may be digital or analog. In some embodiments, the player 108 and recorder 106 may be combined together in a single entity.

The example operating environment 100 may also include storage 110. The storage 110 may be accessible by any, or all, of the other entities in the operating environment, including client 102, server 104, recorder 106, and player 108. In some embodiments, the recorder 106, client 102, and server 104, may generate new/modified audio and video files and retrievably store the files in the storage 110. In addition to the storage 110, or as an alternative, one or more of the client 102, server 104, recorder 106, and player 108, may have their own respective on-board storage where audio and video files may be retrievably stored.

C. Aspects of Some Example Embodiments

In general, example embodiments embrace systems, methods, and processes which allow for the addition of emotion and/or tone into the output of a streaming voice-to-video system, where such output may take the form of a pre-recorded video of a user who is speaking in real time while the video is being played back to a viewer. In more detail, example embodiments may employ labeled data, such as videos of the user, or face manipulation rules, for example, that correspond to a defined standard set of emotions. Embodiments may then employ faceswap or facewarp to enable the output of the voice-to-video system to be modified to make the speaker appear to display, in the pre-recorded video, the correct emotions while speaking in real time, or near real time, as the pre-recorded video is being played. In this way, example embodiments may operate to mimic a live speaking experience.

C.1 Faceswap

As noted elsewhere herein, some embodiments may operate to insert emotion and tone into a pre-recorded video using a faceswap process. In general, the pre-recorded video may be of a user and may be played back to a viewer while a user is speaking in real time. The tone and emotion exhibited by the user while speaking may be inserted into the pre-recorded video as the video is being played back, so that the video appears to show the user speaking and emoting in real time. The viewer may have the impression, from the modified video, that the user is live when in fact, the user in the video is not live, and only the speaking/emotions of the user are being presented in real time, or near real time, in the video.

Generally, an example faceswap method may involve first replacing the face in the video frames to be displayed with faces which show the emotion/tone found in the voice of the user, and then modifying those frames that include the replacement faces to make the user appear to be speaking live. Various components may be employed to perform these processes.

One of the components may be a model which takes as input a recorded segment of human voice and outputs a categorization of emotion detected in the recorded voice segment, such as happy, sad, angry, for example. Another component, or function, employed in the faceswap embodiment may be one which takes as input two images that both contain a human face, and either also takes as input the bounding boxes of the faces within the images, or has the ability to find the bounding boxes on its own. When called, the function may replace the face in one image with the face found in the other image. As used herein, the 'bounding box' refers to the boundary of an area of the image that includes the face. Some, or all, portions of the bounding box may conform precisely to the outline of the face, or may extend beyond the face and include area and elements that are not part of the face. Still another component that may be employed in the faceswap embodiment is a continuously streaming voice-to-video system that may include a face prediction model. Examples of such a continuously streaming voice-to-video system are disclosed in the '121 application.

Figure 2A:
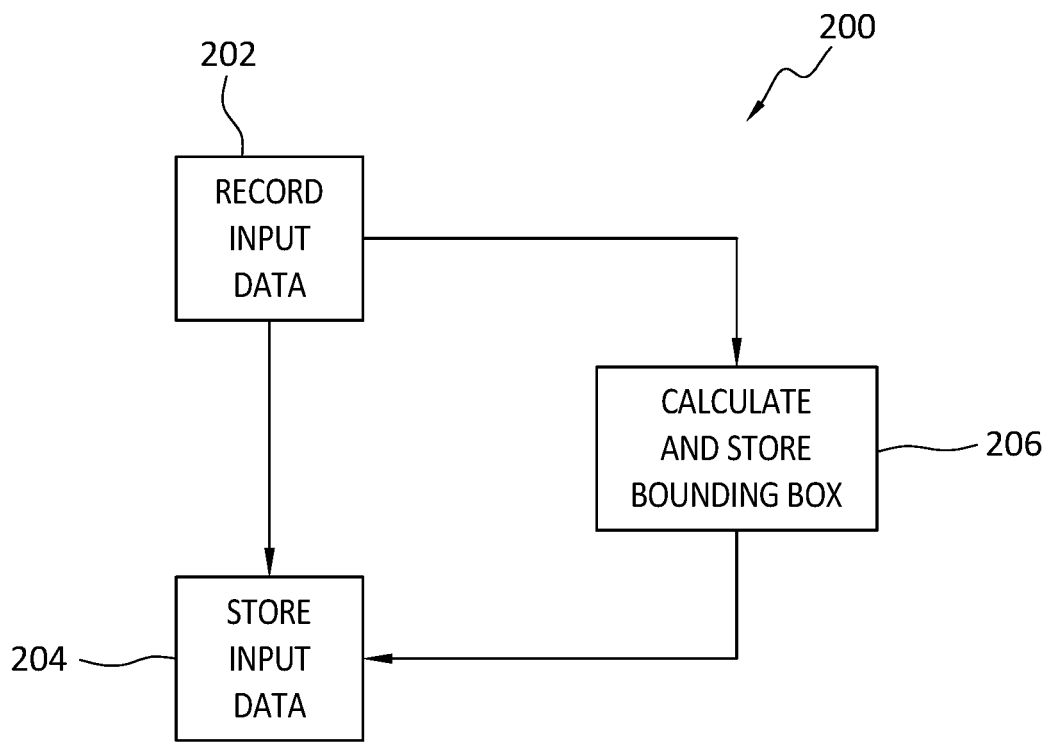
FIG. 2a discloses aspects of a process for recording and storing input data.
Figure 2B:
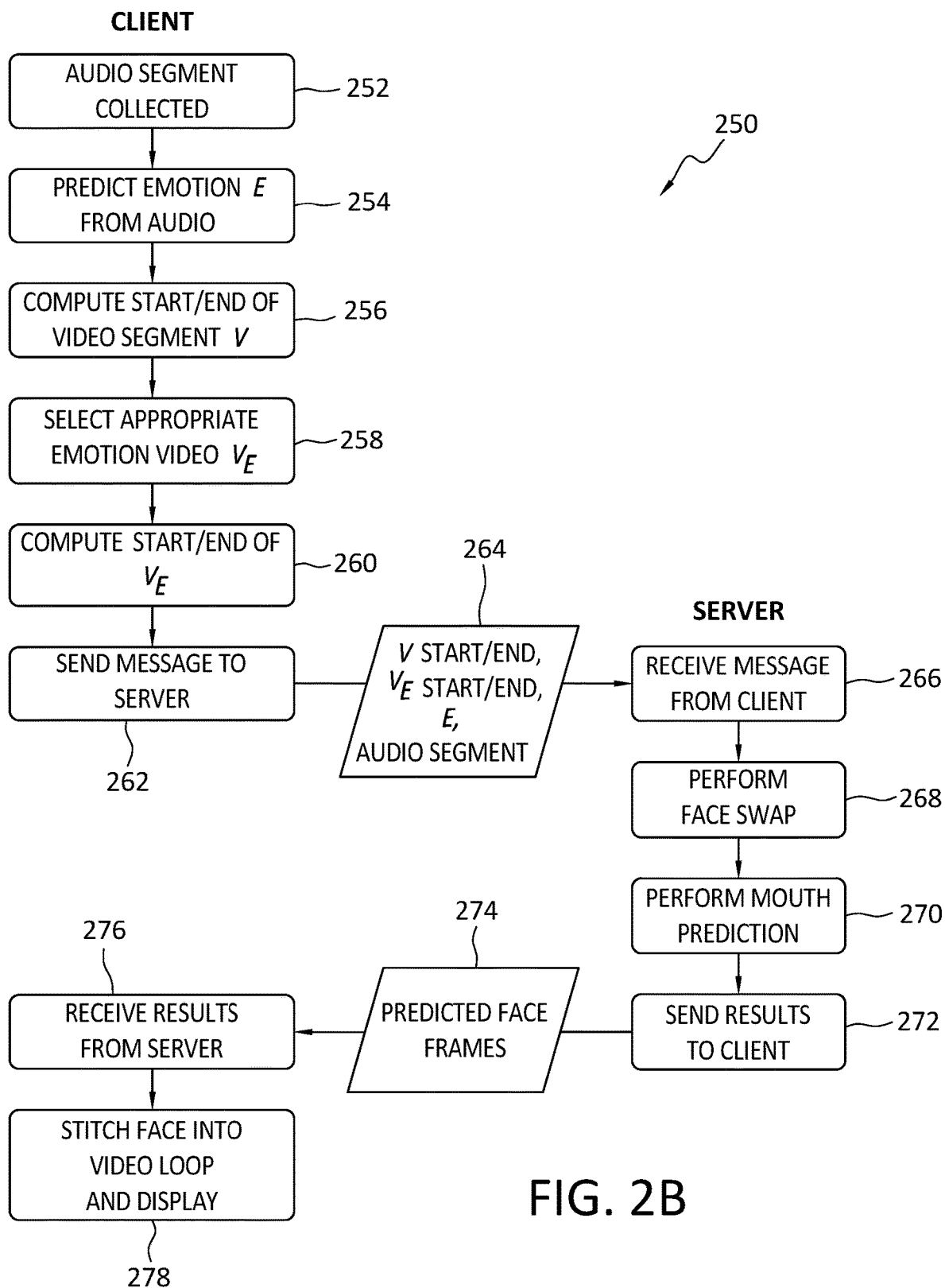
FIG. 2b discloses aspects of a process for modifying a video using a faceswap process.

With reference now to FIG. 2*a*, a method 200 may be performed that may provide input data for the method 250 depicted in FIG. 2*b*. Initially, various input data may be recorded 202 by a recorder, such as by a video camera for example. In at least some embodiments, the input data may comprise, for each of one or more emotions of a user, one or more videos of the face of the user. Thus, for example, to display the 5 emotions of happiness, sadness, anger, surprise, and neutral, the user may record 202 at least five videos of herself, one for each emotion, and label the videos according to the emotion shown in the video.

The videos may be any length, though particularly good results may be achieved when each video is at least a few seconds long so as to obtain a reasonable number of frames capturing the emotion of the user. Additionally, optimal results may be obtained by ensuring that the face of the user is in clear view of the camera for the duration of each video. The user may choose to record and label multiple videos for each emotion. If the user records multiple videos for reach emotion, various criteria may be applied during a video selection process to determine, for a particular emotion, which video will be used in a particular case or circumstance.

After the input videos are recorded 202, they may then be stored 204, such as in storage 110, so that the system can access the input videos based on the emotions they display. Additionally, to improve performance, the bounding box of the user face in each frame of each video may be calculated and stored 206 alongside the input videos ahead of time. This approach may save time when the system is running as the system will not need to search for the face at runtime. After the input videos are stored 204, the system may operate as shown in FIG. 2b.

As shown in the example method 250 of FIG. 2b, various operations may be performed by a client, and by a server. It is noted that the functional allocations disclosed in FIG. 2b, FIG. 3 (discussed below), and elsewhere herein, are presented only by way of example and, in other embodiments, the functions may be allocated differently as between the client and the server.

Various terminology is employed herein in connection with the method 250 disclosed in FIG. 2b. Particularly, the notation V refers to the neutral base video, that is, the pre-recorded, and unmodified, video. The notation $V_E$ refers to a particular video clip labeled or identified as displaying a certain emotion E.

Prior to the method 250, and in addition to the base input video V being shared between the client and the server, the emotion videos $V_E$ and, in some embodiments, their accompanying bounding box data, may also be made accessible to both the client and server. The method 250 may begin when a segment of voice data, that is, audio, is collected 252, by a recorder such as a video camera or voice recorder for example, on the client and then sent to an emotion prediction model, which predicts 254 the emotion E of the speaker based on the collected voice data segment. The collection 252 may be performed in real time while the pre-recorded video is being displayed to a viewer. That is, the user may be speaking, and the collection 252 performed, while the pre-recorded video is being displayed.

Next, the system, and specifically the client in some embodiments, may calculate the segment of V which should be used in the mouth prediction (as disclosed in the '121 application). This calculation may comprise determining 256 the start/end of the video segment V.

After the segment V has been calculated, the system may find an input video $V_E$ matching the emotion E that was predicted at 254. If multiple videos exist for E, one video can be selected 258 via a number of methods, such as a random selection for example. Next, a section of frames from $V_E$ matching the length of the audio segment may be chosen and represented 260 as start and end indices, or times. This section of frames, or $V_E$ segment, may be chosen using a number of methods. One such method may be to implement a data structure which tracks which were the last frames used from each of the possible emotion input videos $V_E$. As discussed below, there may be various reasons to keep track of those frames.

For example, if the spoken emotion of a user lasts for longer than the length of a single audio segment, it may be beneficial to use consecutive sequences of frames from $V_E$ until the user emotion changes. In this case, it may be useful to use a non-random method for selecting $V_E$ 258. That is, for example, it may be best to keep using the same video $V_E$ for a given emotion at least until the user emotion changes. As another example, it may be useful to know what frames from the emotion input videos $V_E$ have already been shown so as to help ensure the display of a good mix of frames, that include faces, are being shown, rather than just using the same few frames over and over again.

Returning now to the method 250, after the start/end of $V_E$ have been computed 260, a message may be sent by the client to the server containing 264 at least the start and end indices for the frames of V to use, an identifier for $V_E$, the start and end indices for the frames of $V_E$ to use, and the audio segment. The message is then received 266 by the server from the client.

After receiving 266 the message from the client, the server may then implement 268 a face swap function to stitch the faces from the specified frames of $V_E$ into the frames of V. The thus modified segment of V, and the audio segment, may then be fed into a face prediction model, examples of which are disclosed in the '121 application, which may then output 270 the new faces, with the mouth in those faces altered to appear to be speaking the words which were spoken in the audio segment, and information on how to stitch them back into the original frames from V. The output of the face prediction model may then be sent 272 back to the client where, after receipt 276 of the results from the server, the predicted face frames 274 may be stitched 278 back into their original frames. The modified video may then be displayed to a viewer. The method 250 may be performed while a user is speaking, such that the modified, and displayed, video resulting at 278 includes the real time, or near real time, audio/emotion/tone of the user. In this way, the viewer of the modified video may perceive, at once, both pre-recorded faces of the user and the real time, or near real time, audio/emotion/tone of the user.

C.2 Facewarp

As noted elsewhere herein, some embodiments may employ a facewarp process in modifying a pre-recorded video to include audio/emotion/tone of a user. The emotion may be inserted into the pre-recorded video and the modified video displayed to a viewer in near real time so that, from the perspective of the viewer, the user may appear to be speaking in real time, or near real time, with the display of the video.

For example, least some embodiments may operate to warp the face of a user in the frames to be displayed so they appear to show the emotion detected in the voice of the user. Then those frames may be modified to make the user appear to be speaking. In addition to the emotion detection system and the voice-to-video system used above, the facewarp approach may implement a function which takes, as input, an image containing a human face, a list of coordinates of key points on the face in the image, and an equally sized list of x, y offsets. The key points may be a list of 68 of the most defining points of the face. When called, the function may manipulate the input image, specifically the face, by warping it at the key face points by the amount defined by the offsets.

In contrast with embodiments that use a faceswap functionality, embodiments employing a facewarp function do not require the user to record any extra videos beyond their base input video. Instead, the facewarp embodiments may employ an input data set comprising labeled sequences of facial movements to be applied as warpings of a face in an image. In other words, a face may be thought of as a collection of points representing the outlines of its most prominent features, with points variously representing the nose, eyes, the upper lip/lower lip, eyebrows, cheeks, forehead, ears, and other facial features. When a human shows emotion in his face, he is moving and/or distorting one or more of these facial features in different ways and to different extents, depending on the emotion he is feeling. For example, if someone is surprised, his eyes may open wide, and when he is happy, he may raise his cheeks. The input data employed in embodiments that use a facewarp function may be representations of those changes in the facial features, stored as a sequence of movements of each of the points that make up a face.

This input data set, or data sets, may be generated and recorded ahead of time by measuring changes in facial features given different displayed emotions. Because this data may represent only movements of various facial features and not the shape or size of the features themselves, the data may be computed once and then applied generically to any human. For example, different humans tend to move the same facial features when smiling. Thus, such input data sets may be packaged with the system so that each user of the system would not need to perform this process themselves.

Figure 3:
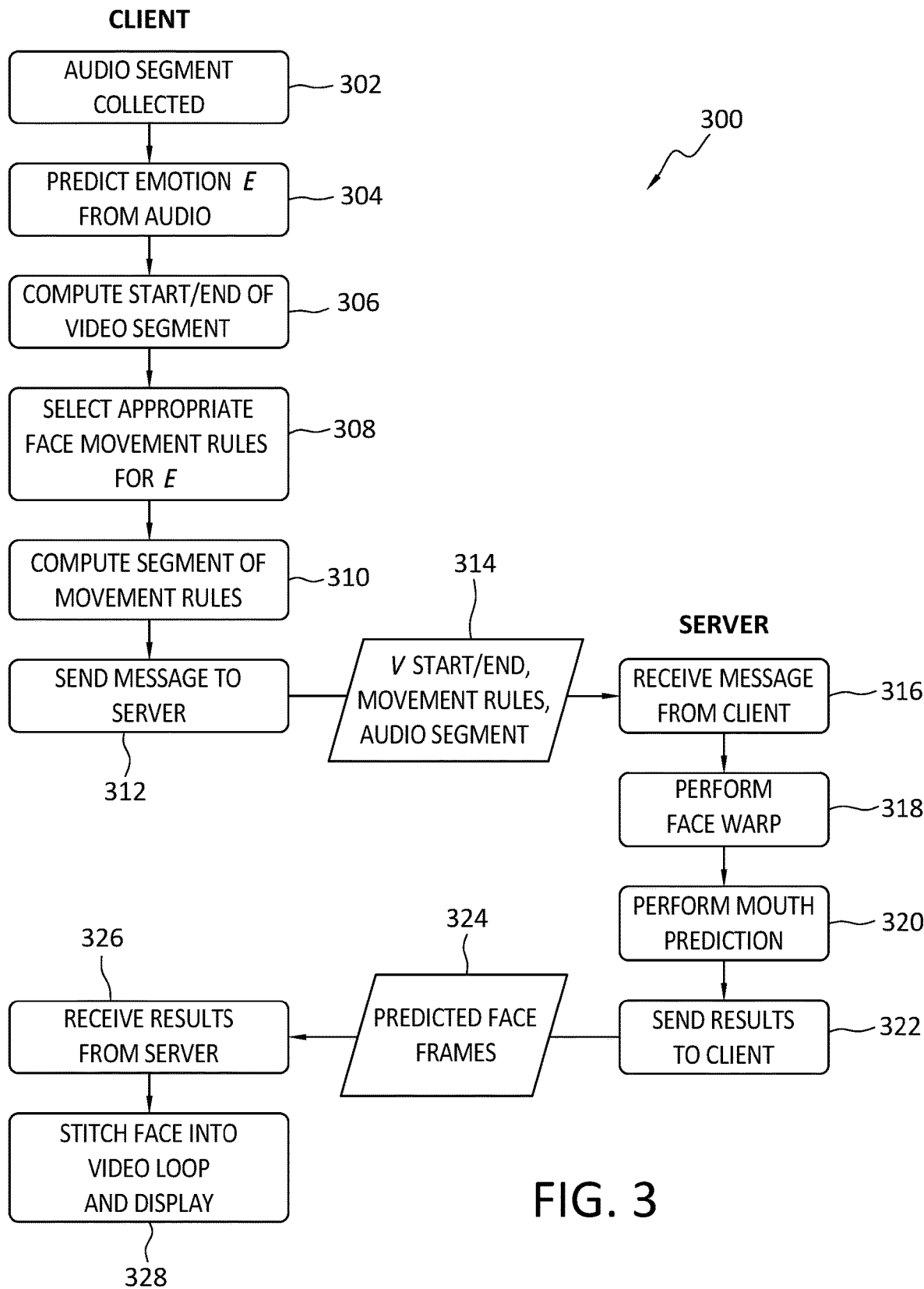
FIG. 3 discloses aspects of a process for modifying a video using a facewarp process.

The generation of the input data may be performed prior to, or as part of, the method 300 of FIG. 3. In general, the method 300 may be similar to the method 250 except that the method 300 may use a set of facial movement rules instead of a pre-recorded emotion clip VE, and except for the fact that the method 300 may perform a facewarp process rather than the faceswap process of the method 250. As well, and prior to performance of the method 300, a base input video V may be shared between the client and server, and various facial movement rules, which may reside in the storage 110 for example, may be made accessible to the client.

The example method 300 may begin with collection 302 of one or more audio, or voice, segments. The audio segments may be sent to an emotion prediction model which may, like process 254, operate to predict 304, or determine, an emotion E of the speaker based on an analysis of the audio segments. The system may then calculate 306, or otherwise determine, the segment of V which should be used in the mouth prediction. The calculation 306 may comprise finding the facial movement sequence that matches, or most closely matches, the emotion E.

Next, a collection of one or more face movement rules matching the emotion E may be selected 308. The face movement rules may be chosen using a number of methods. One such method may employ a data structure which tracks which were the last face movements used from each of the possible face movement rule sets. For the same reasons that it may be useful to keep track of displayed segments of $V_E$, as explained in the discussion of FIG. 2b, it may be useful to keep track of the last face movements used from each of the possible face movement rule sets. At 310, a determination may be made as to which video segment(s) the selected face movement rules apply to.

A message may then be sent 312 from the client to the server. The message may include information 314 such as the start and end indices for the frames of V to use, the facial movement rules to use based on E, and the audio segment. The server may receive 316 the message from the client, and the server may then warp the face 318 that is found in the specified frames of V. The warping may be performed based on the supplied facial movement rules received 316 from the client.

After the face warping has been completed 318, the modified segment of V, that is, the segment of V that includes the warped face, and the audio segment may be fed into a face prediction model, examples of which are disclosed in the '121 application. The face prediction model may then output 320 the new faces with the mouth altered to appear to be speaking the words which were spoken in the audio segment, along with information on how to stitch the new faces back into the original frames from V. The face prediction model may then send 322 its output 324 from the server. The output 324 may be received 326 by the client where the faces are stitched back into their original frames.

C.3 Further Aspects of Disclosed Methods

It is noted with respect to the example methods disclosed herein, including the methods of FIGS. 2, 2a, and 3, that any of the disclosed processes, operations, methods, and/or any portion of any of these, may be performed in response to, as a result of, and/or based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

D. Further Discussion

As will be apparent from this disclosure, example embodiments may provide various useful features and functionalities, although no embodiment is required to have or implement any particular feature or function. One such feature of some embodiments is the use of audio emotion detection to generate and/or modify a synthesized face, displayed as part of a video, so that the lips of the face are synchronized with the audio, and the emotions of the speaker or user, who is generating, or has generated, the audio, are conveyed by the displayed synthesized face in the video. In this way, example embodiments may generate, and continuously stream, constructed video data that includes voice and emotions/tone data that have been inserted into the video.

As another example, embodiments may use a collection of pre-recorded videos to faceswap an expressive face, that is, a face that expresses an emotion, over a neutral face, in synthesized video when an emotion detection trigger is activated in a live video setting. The voice in the synthesized video may also express emotion and a particular tone. That is, emotion detection and faceswap may be implemented together in some embodiments such that the faceswap is performed based on input from an emotion detection process. Further, embodiments may add a pre-recorded facial expression from the same person to their own body/face as displayed in the video.

In a final example, embodiments may use a collection of facial movement rules to facewarp a neutral face of a video into an expressive face, that is a face that expresses an emotion, in synthesized video when an emotion detection trigger is activated in a live video setting. Such embodiments may directly manipulate an underlying live video based on data from a set of facial movement rules.

E. Further Example Embodiments

Following are some further example embodiments of the invention. These are presented only by way of example and are not intended to limit the scope of the invention in any way.

Embodiment 1

A method, comprising: collecting an audio segment that comprises audio data generated by a user; analyzing the audio data to identify an emotion expressed by the user; computing start and end indices of a video segment; selecting video data that shows the emotion expressed by the user; using the video data and the start and end indices of the video segment to modify a face of the user as the face appears in the video segment so as to generate modified face frames; and stitching the modified face frames into the video segment to create a modified video segment with the emotion expressed by the user, and the modified video segment includes the audio data generated by the user.

Embodiment 2

The method as recited in embodiment 1, wherein the face of the user in the video segment is modified using a faceswap process that comprises replacing a face of the user in the video segment with a face of the user taken from another video.

Embodiment 3

The method as recited in embodiment 2, wherein after the face is modified, but before the stitching, a mouth prediction process is performed in which a mouth of the face in the video segment is altered to appear to be speaking words which were spoken in the audio segment.

Embodiment 4

The method as recited in embodiment 2, wherein selecting video data that shows the emotion expressed by the user comprises selecting a pre-recorded emotion video that shows the emotion expressed by the user.

Embodiment 5

The method as recited in embodiment 4, further comprising computing start and end indices for the pre-recorded emotion video, and the faceswap process is performed based in part on the start and end indices of the pre-recorded emotion video.

Embodiment 6

The method as recited in any of embodiments 1-5, wherein the audio segment of the modified video segment is presented to a viewer in near real time.

Embodiment 7

The method as recited in embodiment 1, wherein the face of the user in the video segment is modified using a facewarp process based on an input data set comprising labeled sequences of facial movements.

Embodiment 8

The method as recited in embodiment 7, wherein the facewarp process is performed based in part on face movement rules.

Embodiment 9

The method as recited in embodiment 7, wherein after the face is modified, but before the stitching, a mouth prediction process is performed in which a mouth of the face in the video segment is altered to appear to be speaking words which were spoken in the audio segment.

Embodiment 10

The method as recited in embodiment 7, wherein the audio segment of the modified video segment is presented to a viewer in near real time.

Embodiment 11

A method for performing any of the operations, methods, or processes, or any portion of any of these, disclosed herein.

Embodiment 12

A computer readable storage medium having stored therein instructions that are executable by one or more hardware processors to perform operations comprising the operations of any one or more of embodiments 1-11.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 4:
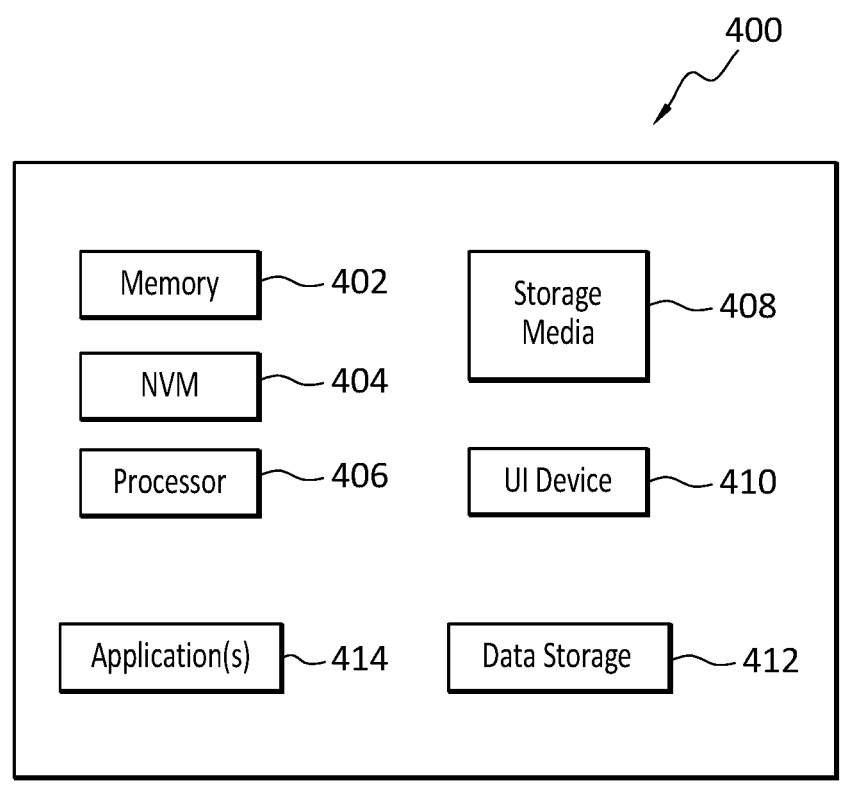
FIG. 4 discloses aspects of an example computing entity operable to perform any of the claimed methods, processes, and operations.

With reference briefly now to FIG. 4, any one or more of the entities disclosed, or implied, by FIGS. 1-3 and/or elsewhere herein, may take the form of, or include, or be implemented on, or hosted by, a physical computing device, one example of which is denoted at 400. As well, where any of the aforementioned elements comprise or consist of a virtual machine (VM), that VM may constitute a virtualization of any combination of the physical components disclosed in FIG. 4.

In the example of FIG. 4, the physical computing device 400 includes a memory 402 which may include one, some, or all, of random access memory (RAM), non-volatile memory (NVM) 404 such as NVRAM for example, read-only memory (ROM), and persistent memory, one or more hardware processors 406, non-transitory storage media 408, UI device 410, and data storage 412. One or more of the memory components 402 of the physical computing device 400 may take the form of solid state device (SSD) storage. As well, one or more applications 414 may be provided that comprise instructions executable by one or more hardware processors 406 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
collecting an audio segment that comprises audio data generated by a user;
analyzing the audio data to identify an emotion expressed by the user;
computing start and end indices for frames of a video segment, which includes a representation of a face of the user, and the representation comprises facial features;
selecting video data that shows the emotion expressed by the user from among a plurality of video data, of which each has been prerecorded by the user expressing a respective emotion;
using the video data and the start and end indices for the frames of the video segment to modify the representation appearing in the video segment so as to generate modified faces in the selected video data based on the audio segment so that the modified faces in the selected video data appear to be speaking words in the audio segment; and
stitching the modified faces from the selected video data over faces in the video segment, thereby swapping the faces in the video segment with the modified faces in the selected video data, to create a modified video segment with the emotion expressed by the user,
wherein the modified video segment includes the audio data generated by the user.

2. The method as recited in claim 1, wherein the representation in the video segment is modified using a faceswap process that comprises replacing the representation in the video segment with an image of the face of the user taken from another video.

3. The method as recited in claim 2, wherein selecting video data that shows the emotion expressed by the user comprises selecting a pre-recorded emotion video that shows the emotion expressed by the user.

4. The method as recited in claim 3, further comprising computing start and end indices for the pre-recorded emotion video, and the faceswap process is performed based in part on the start and end indices of the pre-recorded emotion video.

5. The method as recited in claim 1, comprising presenting the modified video segment so that although the audio data in the modified video segment does not comprise real time audio data, the modified video segment, as presented, still appears to be a real time video of the user.

6. The method as recited in claim 1, wherein the representation in the video segment is modified using a facewarp process based on an input data set comprising labeled sequences of facial movements.

7. The method as recited in claim 6, wherein the facewarp process is performed based in part on face movement rules.

8. The method as recited in claim 6, wherein the audio segment of the modified video segment is presented to a viewer in near real time as the audio segment is being recorded.

9. A non-transitory computer readable storage medium having stored therein instructions that are executable by one or more hardware processors to perform operations comprising:

collecting an audio segment that comprises audio data generated by a user;

analyzing the audio data to identify an emotion expressed by the user;

computing start and end indices for frames of a video segment, which includes a representation of a face of the user, and the representation comprises facial features;

selecting video data that shows the emotion expressed by the user from among a plurality of video data, of which each has been prerecorded by the user expressing a respective emotion;

using the video data and the start and end indices for the frames of the video segment to modify the representation appearing in the video segment so as to generate modified faces in the selected video data based on the audio segment so that the modified faces in the selected video data appear to be speaking words in the audio segment; and stitching the modified faces from the selected video data over faces in the video segment, thereby swapping the faces in the video segment with the modified faces in the selected video data, to create a modified video segment with the emotion expressed by the user, and the modified video segment includes the audio data generated by the user.

10. The non-transitory computer readable storage medium as recited in claim 9, wherein the representation in the video segment is modified using a faceswap process that comprises replacing the representation in the video segment with an image of the face of the user taken from another video.

11. The non-transitory computer readable storage medium as recited in claim 10, wherein selecting video data that shows the emotion expressed by the user comprises selecting a pre-recorded emotion video that shows the emotion expressed by the user.

12. The non-transitory computer readable storage medium as recited in claim 11, further comprising computing start and end indices for the pre-recorded emotion video, and the faceswap process is performed based in part on the start and end indices of the pre-recorded emotion video.

13. The non-transitory computer readable storage medium as recited in claim 9, wherein the operations comprise presenting the modified video segment so that although the audio data in the modified video segment does not comprise real time audio data, the modified video segment, as presented, still appears to be a real time video of the user.

14. The non-transitory computer readable storage medium as recited in claim 9, wherein the representation in the video segment is modified using a facewarp process based on an input data set comprising labeled sequences of facial movements.

15. The non-transitory computer readable storage medium as recited in claim 14, wherein the facewarp process is performed based in part on face movement rules.

16. The non-transitory computer readable storage medium as recited in claim 14, wherein the audio segment of the modified video segment is presented to a viewer in near real time as the audio segment is being recorded.

17. The method as recited in claim 1, further comprising:
performing, in non-real time after the user has finished generating the audio data, a mouth prediction process in which a mouth of the facial features of the representation in the video segment is altered to appear to be speaking words which were spoken in the audio segment.

18. The non-transitory computer readable storage medium as recited in claim 9, wherein the operations further comprises performing, in non-real time after the user has finished generating the audio data, a mouth prediction process in which a mouth of the facial features of the representation in the video segment is altered to appear to be speaking words which were spoken in the audio segment.

* * * * *